United States Patent
Light et al.

(10) Patent No.: US 6,178,371 B1
(45) Date of Patent: *Jan. 23, 2001

(54) VEHICLE SPEED CONTROL SYSTEM AND METHOD

(75) Inventors: Dennis Allen Light, Canton; Michael John Cullen, Northville; Richard John Hippley, Canton, all of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/290,916

(22) Filed: Apr. 12, 1999

(51) Int. Cl.$^7$ .................................. B60T 8/32; G06F 7/00
(52) U.S. Cl. ...................... 701/93; 701/110; 123/339.12; 180/170
(58) Field of Search ................................ 701/93, 96, 110, 701/94, 97, 70; 123/352, 339.22, 339.23, 339.19, 480, 350, 531, 339.12, 339.14; 180/170, 180, 197, 179, 171; 73/118.1

(56) References Cited

U.S. PATENT DOCUMENTS

| | | | |
|---|---|---|---|
| 4,771,848 | * 9/1988 | Namba et al. ................. | 180/197 |
| 4,843,553 | * 6/1989 | Ohata ............................. | 701/93 |
| 4,862,367 | 8/1989 | Tada et al. ..................... | 701/93 |
| 4,951,627 | * 8/1990 | Watanabe et al. ............. | 477/111 |
| 4,967,358 | * 10/1990 | Etoh ................................ | 701/97 |
| 5,018,383 | * 5/1991 | Togai et al. ................... | 73/118.1 |
| 5,375,574 | * 12/1994 | Tomisawa et al. ............ | 123/339.22 |
| 5,392,215 | * 2/1995 | Morita ............................ | 701/94 |
| 5,479,898 | 1/1996 | Cullen et al. .................. | 123/350 |
| 5,483,941 | 1/1996 | Cullen et al. .................. | 123/481 |
| 5,492,094 | * 2/1996 | Cullen et al. .................. | 123/396 |
| 5,508,923 | * 4/1996 | Ibamoto et al. ................ | 701/70 |
| 5,646,851 | 7/1997 | O'Connell et al. ............ | 701/93 |
| 5,657,230 | 8/1997 | Hess et al. ..................... | 701/104 |
| 5,778,331 | 7/1998 | Leising et al. ................. | 701/66 |
| 5,794,735 | 8/1998 | Sigl ................................ | 180/170 |
| 6,006,724 | * 12/1999 | Takahashi et al. ............. | 123/339.19 |
| 6,039,023 | * 3/2000 | Cullen et al. .................. | 123/339.23 |
| 6,061,623 | * 5/2000 | Hippley et al. ................ | 701/93 |
| 6,078,859 | * 6/2000 | Jastrzebski et al. ........... | 701/93 |

* cited by examiner

Primary Examiner—Jacques H. Louis-Jacques
(74) Attorney, Agent, or Firm—John D. Russell

(57) ABSTRACT

A speed control method for vehicles having an internal combustion engine smoothly controls engine torque to control vehicle speed. Torque is controlled via airflow in a first torque control range. Torque is controlled via a coordination of air/fuel ratio, ignition timing, and cylinder deactivation is a second torque control range. The torque range is selected based on the required airflow to deliver the required torque. If the required airflow is less than a lower allowable value, then the airflow is fixed at this lower allowable value and the second range is selected. Otherwise, the first range is selected.

19 Claims, 3 Drawing Sheets

VEHICLE SPEED CONTROL SYSTEM AND METHOD

FIELD OF THE INVENTION

The invention relates to vehicle speed control, or cruise control, of a vehicle powered by an internal combustion engine where engine brake torque is controlled to a continuously variable level in both the positive and negative direction.

BACKGROUND OF THE INVENTION

Vehicle speed control systems are utilized to cause the actual vehicle speed to achieve a target vehicle speed set by the vehicle driver. To control vehicle speed, engine torque is adjusted to a value that will cause the actual vehicle speed to achieve the target through manipulation of various parameters that influence engine torque.

A particular situation that has posed considerable challenge in vehicle speed control systems is controlling vehicle speed on a downgrade. In this situation, the engine must be controlled to absorb energy. In an alternate viewpoint, the engine brake torque, which is the torque at the crankshaft available to the vehicle driveline, must be controlled to a negative value.

One method of vehicle speed control controls engine airflow and cylinder deactivation. In this method, a throttle actuator controls engine airflow so that the actual vehicle speed reaches the desired vehicle speed. If an overspeed condition exists, i.e. the actual vehicle speed is greater than the desired vehicle speed and the throttle actuator reaches its lower physical limit, then cylinder deactivation is employed. In this method, the control first employs airflow control. When the airflow reaches its minimum physical value, then cylinder deactivation is used to further decrease the vehicle speed. In other words, airflow control is utilized until the airflow is moved to the minimum physical value (dictated by various air leakage paths), then other methods of reducing engine torque are utilized. One such method is disclosed in U.S. Pat. No. 4,862,367.

The inventors herein have recognized a disadvantage with the above approach. When the engine torque is controlled via airflow, a smooth and continuous engine torque is provided to smoothly control vehicle speed. However, when the airflow reaches its physical minimum value, there is a shock to the vehicle as the torque is further reduced via cylinder deactivation. This disadvantage can be moderated by decreasing the minimum physical airflow value through various mechanical design alternatives and minimization of leakage; however, there will always be some leakage airflow through the engine and thus the minimum airflow will never be zero. Therefore, when practicing the above method, there will always be a shock to the vehicle when it is necessary to deactivate cylinders to maintain the desired vehicle speed.

The inventors herein have recognized another disadvantage with the above approach. Reducing the minimum airflow limit to such low levels increases incidence of engine misfire, causing an increase in regulated emissions. Thus, the shock cannot be reduced to zero due to current emission regulations and problems associated with engine misfire as extremely low airflows.

Another vehicle speed control system attempts to solve this disadvantage by delaying cylinder deactivation for a predetermined time period or allowing vehicle overspeed situations. Such a system is disclosed in U.S. Pat. No. 5,646,851. The inventors herein have recognized a disadvantage with this approach. Using a delay does not eliminate the shock problem, it simply postpones the problem or reduces the frequency at which to problem occurs. Allowing vehicle overspeed is undesirable to a vehicle driver and thus reduces customer satisfaction.

SUMMARY OF THE INVENTION

An object of the invention claimed herein is to provide a vehicle speed control system capable of smoothly controlling vehicle speed on a downgrade without increase in regulated emissions.

The above object is achieved, and problems of prior approaches overcome, by a method for controlling an actual vehicle speed of a vehicle to a desired vehicle speed, the vehicle having an engine with operating parameters that influence an engine torque. The method comprises the steps of calculating a desired engine torque that would cause the actual vehicle speed to approach the desired vehicle speed, determining a required airflow that would generate said desired engine torque, determining a minimum allowable airflow which would allow adjustment of the operating parameters to adjust the engine torque without adversely affecting engine performance, controlling airflow to said required airflow when said required airflow is greater than said minimum airflow, thereby providing said desired engine torque, and controlling airflow to said minimum airflow and adjusting the operating parameters to provide said desired engine torque when said required airflow is less than said minimum airflow.

By going against the teachings of prior art and raising the lower allowable airflow level during torque control to a value greater than the minimum physical airflow, it is possible to smoothly control engine torque to lower levels using a coordinated combination of cylinder deactivation, spark timing, and/or air/fuel ratio. Further the associated problems of operating at a minimum physical airflow, such as engine misfires, are removed. Thus, in the first torque control range, airflow is used to smoothly control engine torque. In the second torque control range where airflow is held at the minimum allowable airflow, the coordination of cylinder deactivation, spark timing, and/or air/fuel ratio are used to smoothly control engine torque without causing engine misfires. Thus, vehicle speed can be smoothly controlled to the desired vehicle speed, even on downgrades where cylinder deactivation is necessary to reduce the engine brake torque to large negative levels.

An advantage of the present invention is the increased customer satisfaction.

Another advantage of the present invention is the ability to reduce regulated emissions.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
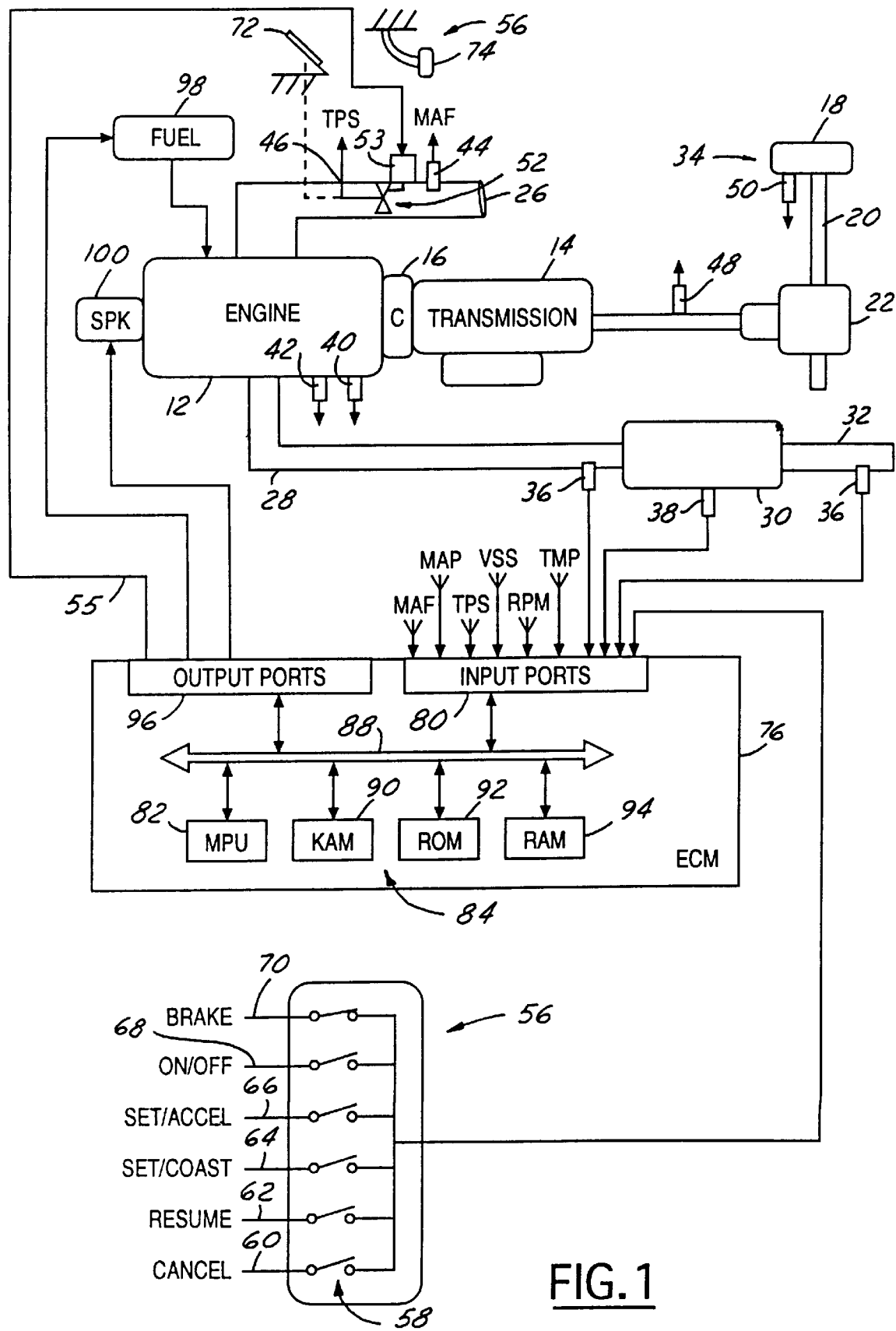
FIG. 1 is a block diagram illustrating a vehicle speed control system and method according to the present invention.

Referring now to FIG. 1, a block diagram illustrating a system and method for vehicle speed control according to the present invention is shown. System 10 includes an engine 12 connected to a transmission 14 via a clutch 16. Vehicle wheels 18 (only one of which is shown) are connected to transmission 14 via axle 20, transaxle 22, and prop shaft 24. While a rear-wheel drive system with a manual transmission is illustrated, the present invention may of course be applied to other vehicle configurations. In a preferred embodiment, engine 12 is a spark ignition (SI) engine which includes an intake 26 and an exhaust 28 connected to a catalytic converter 30 which is connect to an exhaust pipe 32. Various sensors, indicated generally by reference numeral 34, are used to monitor and control operation of engine 12 and/or transmission 14. Of course, the present invention may be applied to various other types of engines, such as compression-ignition or diesel engines. Sensors 34 may include any of a variety of well known sensors such as heated exhaust gas oxygen (HEGO) sensors 36, a catalytic converter temperature sensor 38, engine RPM sensor 40, coolant temperature sensor 42, mass air flow sensor 44, and throttle position sensor 46. Sensors 34 may also include a vehicle speed sensor 48 and one or more wheel speed sensors 50 to provide an indication of vehicle speed.

System 10 also includes various input devices, indicated generally by reference numeral 56, for indicating a desired vehicle speed. Input devices 56 may include switches 58 used to control a cruise control or vehicle speed controller. In a preferred embodiment, switches 58 include a first switch 60 which functions as a cancel switch, a second switch 62 which initiates a resume function, a third switch 64 which initiates a speed set/coast function, a fourth switch 66 which functions as a speed set/accelerate switch, a fifth switch 68 which functions as an on/off switch, and a brake switch 70 which functions similar to the cancel switch 60 to suspend operation of the cruise control function as explained in greater detail below. Input devices 56 also may include an accelerator pedal 72 and brake pedal 74. As illustrated, accelerator pedal 72 is associated with throttle position sensor 46. This may be a mechanical, electromechanical, or purely electrical/electronic connection. For example, in a "drive-by-wire" system, accelerator pedal 72 has an associated sensor which provides an input signal to an engine control module (ECM) 76 which in turn provides an output signal 55 to an air flow actuator or throttling device, such as throttle valve 52 and associated position sensor 46 controlled by motor 53, which constitutes electronic throttle control. For systems without electronic throttle control, accelerator pedal 72 may be mechanically linked to throttle valve 52 to control the opening thereof. For mechanically linked systems, the vehicle cruise control may utilize a servo motor or similar device to control throttle valve 52 when the cruise control mode is activated.

As also illustrated in FIG. 1, system 10 preferably includes a controller, such as ECM 76, in communication with sensors 34 and input devices 56 via input ports 80. ECM 76 includes a microprocessor 82 in communication with various computer readable storage media 84 via a data and control bus 88. Computer-readable storage media 84 may include various types of volatile and non-volatile media or memories such as keep-alive memory 90, read-only memory 92, and random access memory 94. The various memories may be implemented utilizing any of a number of known hardware devices such as flash memory, PROMs, EEPROMs, and other electrical, electromagnetic, and optical storage devices capable of storing data representing instructions executable by a computer.

As is known, computer-readable media 84 contain various program instructions, software, or control logic to affect control of engine 12. Media 84 may include various types of data representing calibration values, current values of operating parameters, microprocessor instructions, and the like. Microprocessor 82 executes various instructions to generate output signals through output ports 96 based on signals received through input ports 80, generally indicative of current operating conditions. Output signals generated by ECM 76 are communicated to various system actuators such as fuel controller 98 and spark controller 100.

ECM 76 may generate various other output signals to control actuators or indicators depending on the particular application. For example, an output signal may be generated to control an air flow actuator, spark timing, and/or fuel quantity to control the torque generated by engine 12. In a preferred embodiment, ECM 76 communicates with input devices 56 and sensors 34 to determine a speed error based on the current vehicle speed and a desired vehicle speed. ECM 76 then determines an appropriate wheel torque to be delivered by engine 12 to wheels 18 of the vehicle based on the speed error and control the torque generated by engine 12 to reduce the speed error toward zero. Preferably, ECM 76 implements a PIQ (proportional-integral-quadratic) closed loop controller to maintain a desired vehicle speed or acceleration as explained below. PIQ control is explained in greater detail in U.S. Pat. No. 5,420,793 to Oo, et al. hereby incorporated by reference in its entirety. Engine torque may be determined as explained in detail in U.S. Pat. No. 5,241,855 to Cullen, et al. hereby incorporated by reference in its entirety. An appropriate wheel torque is then determined based on the tire size, transaxle ratio, and current-transmission ratio. According to the present invention and described in further detail later herein, engine torque is controlled in one of two ways. First, engine torque is controlled by controlling air flow through intake 26 of engine 12. Second, engine torque is controlled by controlling cylinder deactivation via fuel controller 98, and/or controlling spark timing through spark controller 100, and/or controlling air/fuel ratio via fuel controller 98, while airflow is held at a minimum allowable value greater than the minimum physical airflow.

In one embodiment of the present invention, ECM 76 determines a current vehicle acceleration based on a change of the vehicle speed over a predetermined period or event. The vehicle speed may be determined using the vehicle speed sensor 48 and/or one or more wheel speed sensors 50. Alternatively, vehicle acceleration may be determined using an accelerometer or similar device. In this embodiment, ECM 76 determines an appropriate wheel torque to be delivered to wheels 18 based on the current vehicle acceleration and a desired vehicle acceleration. ECM 76 then controls the torque generated by engine 12 to reduce the acceleration error toward zero. Preferably, ECM 76 includes appropriate instructions or control logic implemented in software and hardware to realize both a closed loop PIQ vehicle speed controller and a closed loop PIQ vehicle acceleration controller, the operation of which are mutually exclusive as explained in greater detail below.

Figure 2:
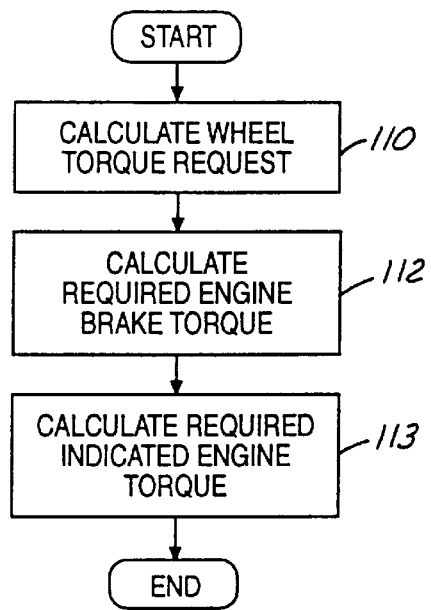
FIGS. 2–3 are high level flow charts of various operations performed by a portion of the embodiment shown in FIG. 1.

Referring now to FIG. 2, a block diagram illustrating various components or modules of the control logic, along with associated outputs, is shown. As one of ordinary skill in the art will appreciate, the various functions or operations shown in FIGS. 2–6 may be performed by software, hardware, or a combination of hardware and software. Furthermore, the particular order of operations and functions illustrated may not be necessary to accomplish the objects and advantages according to the present invention. In general, sequential operation is shown for ease of illustration only. As such, various processes and strategies may be used depending upon the particular application, including multi-tasking, interrupt (time) driven, event driven, or parallel computing strategies may be used to implement the illustrated control logic. Similarly, one of ordinary skill will in the art may recognize various equivalent implementations in hardware and/or software to accomplish the objects and advantages of the present invention. In a preferred embodiment of the present invention, the functions illustrated in FIGS. 2–6 are implemented primarily as software within a controller such as ECM 76.

In FIG. 2, the speed (or acceleration) control logic which maintains a steady vehicle speed or acceleration is executed. The primary inputs for this feature include the vehicle speed, vehicle acceleration, and the status of the command switches for the cruise control. The primary purpose of step 110 is to calculate an absolute wheel torque request (as opposed to a limit or maximum torque request). The value of the wheel torque request parameter represents the torque computed by the active controller which must be delivered to the driven wheel of the vehicle to maintain or resume the desired vehicle speed.

Required brake engine torque is calculated in step 112 from required wheel torque, axle ratio, gear ratio, torque converter speed ratio (if unlocked), and an estimate of the mechanical efficiency is calculated. Required indicated engine torque is calculated in step 113 from brake engine torque plus friction torque where friction torque is calculated as explained in detail in U.S. Pat. No. 5,241,855.

Figure 4:
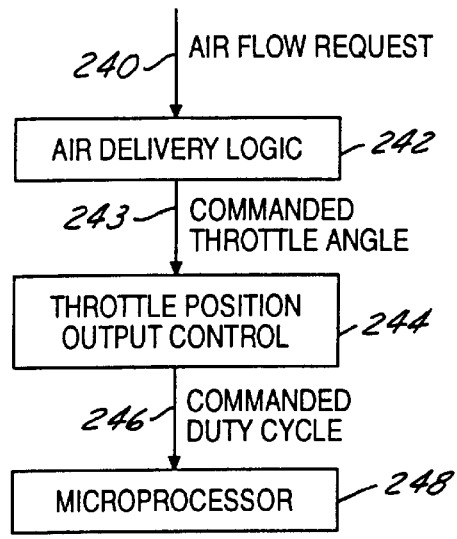
FIG. 4 is a block diagram illustrating organization of an airflow control strategy according to the present invention.
Figure 3:
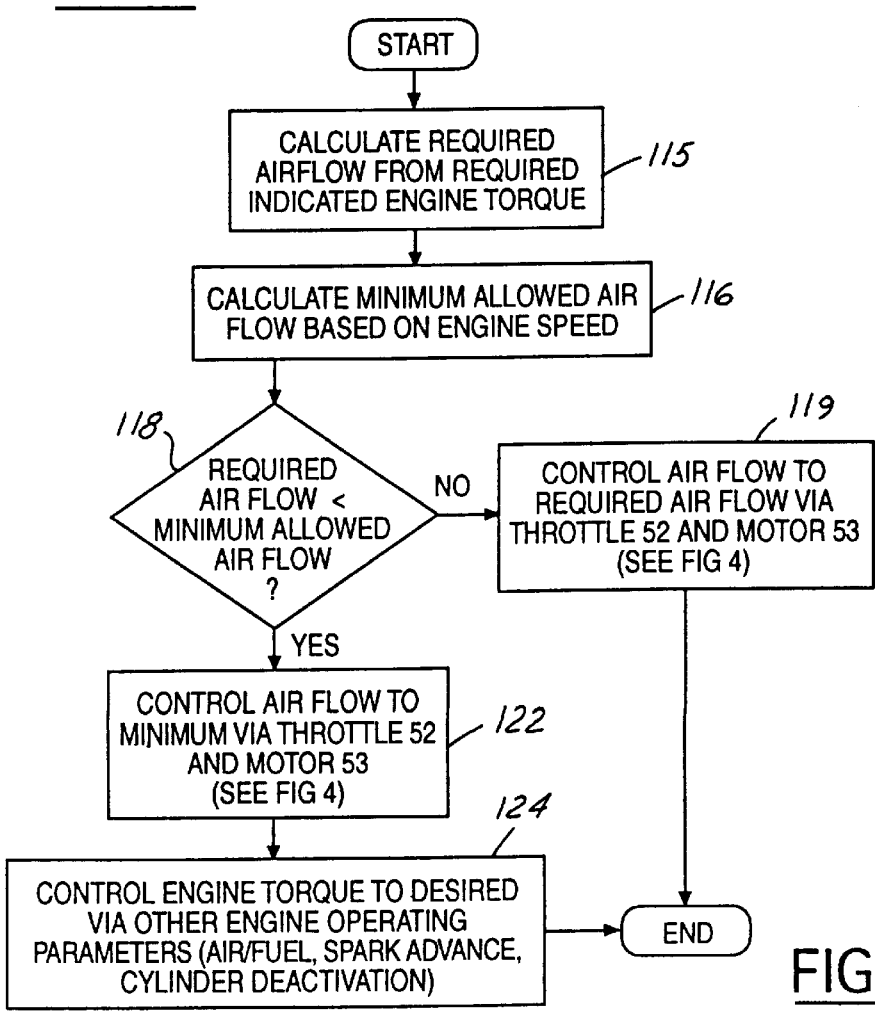

Referring now to FIG. 3, this indicated torque is adjusted for spark retard from MBT and air/fuel deviations from stoichiometric to standardize the value before table look-up. The standardized indicated torque is entered into a table with engine speed to determine required air mass flow in step 115. Then, in step 116, the minimum allowable airflow is calculated based on engine speed. This minimum allowable airflow represents the minimum airflow at which the engine can operate without misfires while retarding ignition timing, and/or operating lean, and/or deactivating cylinders. These values are typically determined during steady state engine mapping. Then, in step 118 a determination is made as to whether the required air mass flow from step 115 is less than the minimum allowable airflow from step 116. When the required air mass flow is not less than the minimum allowable airflow the airflow request, used later herein with particular reference to FIG. 4, is set to the required air mass flow in step 119. In this way, engine torque is controlled to the desired engine torque.

Continuing with FIG. 3, when the required air mass flow is less than the minimum allowable airflow then airflow is controlled to the minimum allowable airflow in step 122 as described later herein with particular reference to FIG. 4, wherein the airflow request is set to the minimum allowable airflow. Then, in step 124, engine torque is controlled via a combination of cylinder deactivation, air/fuel ratio, and spark timing as described in U.S. Pat. No. 5,479,898 to Cullen, et. al. which is incorporated herein by reference. Also, additional parameters can be used for controlling engine torque, such as, for example, variable cam timing, exhaust gas recirculation, or any other parameter that affects engine torque known to those skilled in the art and suggested by this disclosure.

Referring now to FIG. 4, Air delivery control logic, represented by block 242, converts the air flow request 240 from either step 120, in which case the air flow request is the required air mass flow, or 122, in which case the air flow request is the minimum allowable airflow, to a commanded throttle angle. As will be appreciated by one of ordinary skill in the art, speed control logic 242 and air delivery control logic 244 may use one or more look-up tables or equivalent equations which include various calibrations depending on the particular application. The look-up tables and/or equations are used to determine an appropriate output based on one or more inputs. As such, air delivery control logic 242 determines an appropriate commanded throttle angle, represented generally by reference numeral 243. In a preferred embodiment, the required throttle angle is calculated by first standardizing the air mass based on barometric pressure and inlet air temperature (corrected to sea level). The standardized air mass value is then used, along with the pressure ratio across the throttle, to reference a look-up table which determines a required throttle angle or equivalent accelerator pedal position. For vehicles utilizing electronic throttle control systems, the commanded throttle angle is realized by an electric air flow actuator which receives an appropriate signal generated by air delivery control logic 242. In a preferred embodiment, the electric air flow actuator is electric motor 53 coupled to throttle 52.

Blocks 244–248 of FIG. 4 apply only to vehicles which do not utilize electronic throttle control. In these vehicles, the commanded throttle angle is provided to throttle position output control 244 which generates an appropriate commanded duty cycle 246 for microprocessor 248.

Figure 5:
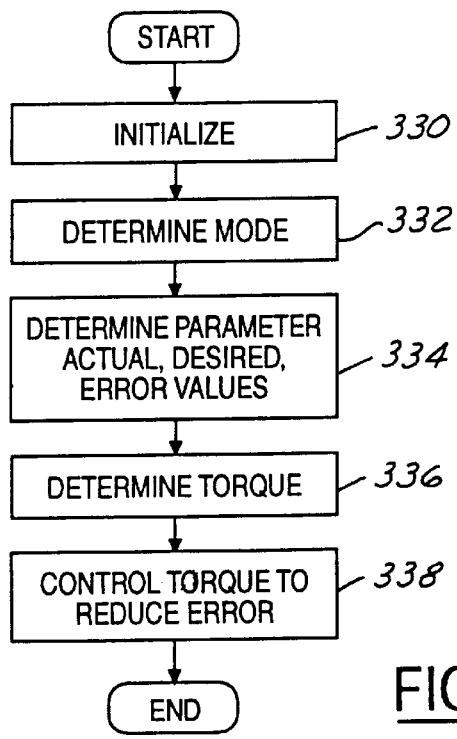
FIG. 5 is a flow chart illustrating control logic for implementing a system and method for vehicle speed control according to the present invention.

Referring now to FIG. 5, a flow chart illustrating a system and method for controlling speed of a vehicle according to the present invention is shown. The flow chart of FIG. 5 is a simplified representation of one embodiment of the invention of which a more detailed representation is illustrated for the embodiment of FIG. 6. Block 330 of FIG. 5 represents a variety of conditional checks which are performed during initialization of the system. These preferably include both internal checks within the software, and external monitoring of various other powertrain components or features. If one or more conditions are not satisfied, the cruise control may be disabled and an appropriate indicator illuminated, such as the check engine light, or the like.

Provided the necessary conditions are satisfied by the initialization represented by block 330, the current operating mode or state is determined as represented by block 332. Only one state or mode may be active or in control at any time and as such, the states are mutually exclusive. The current operating mode or state is generally determined by the previous operating state and the status of the input devices, such as the cruise control switches and accelerator pedal. Preferably, two separate PIQ closed loop controllers are utilized to provide calibration flexibility in tuning the system for optimal performance under various road and engine operating conditions. In such an embodiment, the first controller operates as a vehicle speed (VS) controller while the second controller operates as an acceleration controller. When the vehicle cruise control is active, block 332 determines or selects either the speed control mode or the acceleration control mode, preferably based on user input although other factors may be considered as described with reference to FIG. 6. The acceleration control mode is preferably activated when a continuous acceleration or deceleration request is received. Such a request may be indicated by pressing the set/accel switch 66 or set/coast switch 64 for a calibratable predetermined period of time, such as 640 ms.

A current actual (measured) value is determined for the appropriate control parameter (speed or acceleration) as represented by block 334. The current value is compared to a previously set or desired value to determine an error value. The error value is used to determine a desired wheel torque based on the speed error as indicated by block 336.

Block 338 represents the step of controlling the engine torque generated by the engine based on the selected control mode to reduce the speed error or acceleration error toward zero. The engine torque is controlled by either airflow or by coordination of air/fuel, ignition timing, and cylinder deactivation as described previously herein.

Figure 6:
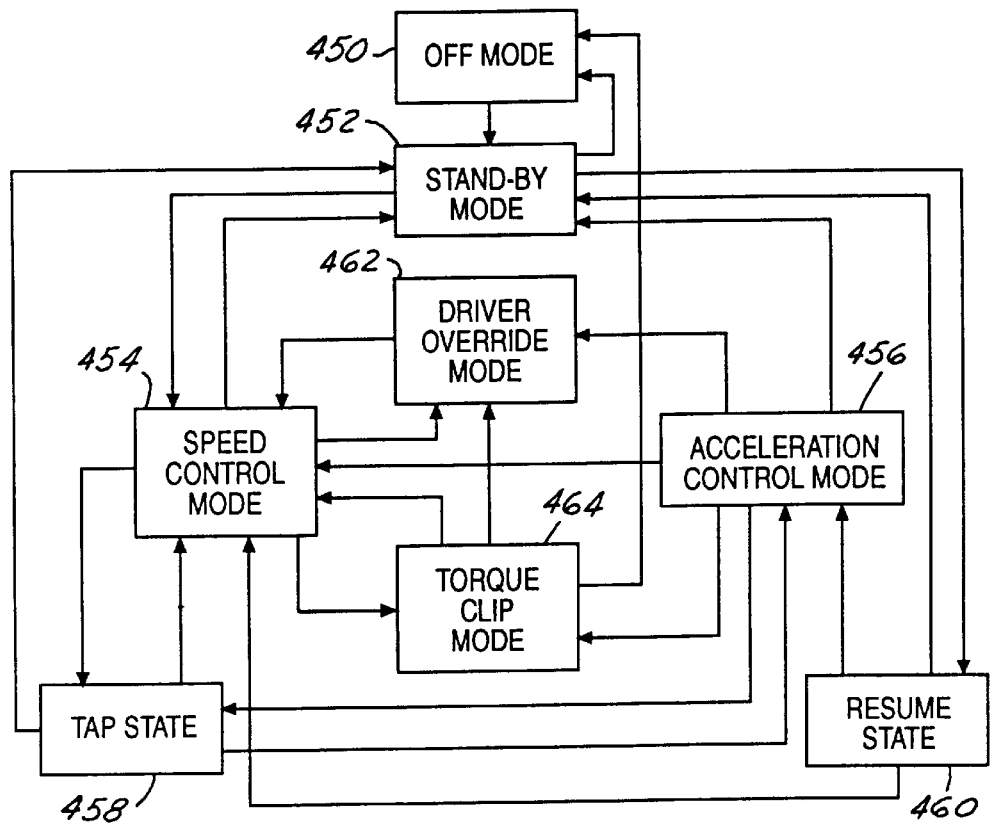
FIG. 6 is a state transition diagram of one embodiment of the present invention.

Referring now to FIG. 6, a state transition diagram for one embodiment of the present invention is shown. As should be appreciated by one of ordinary skill in the art, the number of states, the names of states, and allowed transitions between various states depend upon the particular application and may be implemented in a variety of equivalent manners. As such, the state transition diagram of FIG. 4 provides only one example used to describe the present invention. Preferably, execution of various system operating modes is facilitated through a state machine having states similar to those represented by blocks 450–464. The states or modes include an OFF mode 450, standby mode 452, speed control mode 454, acceleration control mode 456, tap mode 458, resume mode 460, driver override mode 462, and torque clip mode 464. By definition, the state machine represented by the modes in FIG. 4 may exist in only one state (mode) at any time. Arrows indicate allowable state transitions which occur when applicable parameters are satisfied. As will be appreciated by one of ordinary skill in the art, a state transition may result in modification of various status/control variables or parameters which are used to represent the state machine.

Before any mode other than OFF mode 450 may be executed, the system preferably performs a variety of conditional checks which include both internal and external checks to monitor other system components or software features. When the system is not in an active control mode, i.e., speed control mode 454 or acceleration control mode 456, the state machine can be either in OFF mode 450 or standby mode 452. In the OFF mode 460, all the global output registers are reset to default values. In the standby mode 452, the logic executes an open loop torque prediction or pre-positioning to anticipate an engagement command from the driver. During that time, the actual (calculated or inferred) wheel torque output is written into a speed control output register of the speed controller. In a preferred embodiment, the actual torque is determined as a function of a speed/load table, air/fuel ratio, and spark advance as explained in detail in U.S. Pat. No. 5,241,855.

During normal vehicle operation, when the driver sets the desired speed for the first time, the state machine will enter the speed control mode 454 which will be maintained unless a continuous acceleration or deceleration command is issued by the driver. A continuous acceleration command may be indicated, for example, by depressing the set/accel switch for a predetermined calibratable period of time, such as 640 milliseconds. Similarly, a continuous deceleration command may be indicated by depressing the set/decel switch for some time period. It should be noted that acceleration control mode 456 may control either positive or negative acceleration, i.e., deceleration. Acceleration control mode 456 may also be activated when the driver depresses the resume switch. Once the speed error or acceleration error falls below a corresponding threshold, the vehicle speed control mode is activated to maintain the desired or set speed.

Tap mode 458 is entered when either the set/accel switch or the set/coast switch is momentarily depressed. When a sequence of "tap" commands are received, such as by repeatedly pressing and releasing either the set/accel switch or the set/coast switch, the state machine may execute either the vehicle control mode 454 or the acceleration control mode 456 depending on the new value of the set speed and the calibration of the operating bounds. Similarly, when in standby mode 452 and the resume switch is activated so that the state machine enters resume mode 460, either speed control mode 454 or acceleration control mode 456 may become active. When the system is not in either active control mode, i.e., speed control mode 454 or acceleration control mode 456, the system will be in either off mode 450 or standby mode 452.

A driver override mode 462 is activated when torque requested by the driver through the accelerator pedal exceeds torque requested by either the speed control mode 454 or acceleration control mode 456. The driver override mode activates a pre-position torque request and suspends the integrator of the active PIQ control loop to prevent integrator wind-up. The system operates in what may be described as a P-D mode while in driver override mode 462. A transition to speed control mode 454 occurs When the torque requested by the driver via the accelerator pedal falls below the torque requested by speed control mode 454 provided the vehicle speed is above a predetermined reset speed and no "tap" command is received. A torque clip mode may also be provided to limit the maximum or minimum torque level to prevent component damage or engine stalling, respectively. As illustrated, the torque clip mode 464 may transition to either speed control mode 454, driver override mode 1, or OFF mode 450.

While the best mode for carrying out the invention has been described in detail, those familiar with the art to which this invention relates will recognize various alternative designs and embodiments for practicing the invention as defined by the following claims.

We claim:

1. A method for controlling an actual vehicle speed of a vehicle to a desired vehicle speed, the vehicle having an engine with operating parameters that influence an engine torque, the method comprising the steps of:

calculating a desired engine torque that would cause the actual vehicle speed to approach the desired vehicle speed determining a required airflow that would generate said desired engine torque;

determining a minimum allowable airflow which would allow adjustment of the operating parameters to adjust the engine torque without adversely affecting engine performance;

controlling airflow to said required airflow when said required airflow is greater than said minimum airflow, thereby providing said desired engine torque; and controlling airflow to said minimum airflow and adjusting the operating parameters to provide said desired engine torque when said required airflow is less than said minimum airflow.

2. The method recited in claim 1 wherein said engine comprises an electronically controlled throttle for controlling airflow.

3. The method recited in claim 1 wherein said operating parameters comprise an air/fuel ratio of a mixture entering the engine.

4. The method recited in claim 1 wherein said operating parameters comprise an ignition timing of an ignition of a mixture being burned in the engine.

5. The method recited in claim 1 wherein said operating parameters comprise a number of deactivated cylinders.

6. The method recited in claim 1 wherein said step of determining a required airflow further comprises the step of determining a required airflow that would generate said desired engine torque with said operating conditions at nominal settings.

7. The method recited in claim 6 wherein said nominal settings represent an air/fuel ratio at stiochiometry.

8. The method recited in claim 6 wherein said nominal settings represent all cylinders of the engine activated.

9. The method recited in claim 6 wherein said nominal settings represent optimum ignition timing.

10. The method recited in claim 3 wherein said step of determining said minimum allowable airflow further comprises the step of determining said minimum allowable airflow which would allow adjustment of said air/fuel ratio to adjust the engine torque without experiencing engine misfire.

11. The method recited in claim 3 wherein said step of determining said minimum allowable airflow further comprises the step of determining said minimum allowable airflow which would allow adjustment of said ignition timing to adjust the engine torque without experiencing engine misfire.

12. The method recited in claim 3 wherein said step of determining said minimum allowable airflow further comprises the step of determining said minimum allowable airflow which would allow adjustment of said ignition timing and said air/fuel ratio to adjust the engine torque without experiencing engine misfire.

13. The method recited in claim 1 wherein said step of determining a minimum allowable airflow further comprises the step of determining said minimum allowable airflow based on an engine speed.

14. A method for controlling an actual vehicle speed of a vehicle to a desired vehicle speed, the vehicle having an engine with operating parameters that influence an engine torque, the operating parameters comprising an air/fuel ratio of a mixture entering the engine, an ignition timing of an ignition of the mixture being burned in the engine, and a number of deactivated cylinders of the engine, the method comprising the steps of:

calculating a desired engine torque that would cause the actual vehicle speed to approach the desired vehicle speed determining a required airflow based on an engine speed that would generate said desired engine torque with said operating conditions at nominal settings;

determining a minimum allowable airflow which would allow adjustment of at least one of the operating parameters to adjust the engine torque without adversely affecting engine performance;

controlling airflow to said required airflow when said required airflow is greater than said minimum airflow, thereby providing said desired engine torque; and controlling airflow to said minimum airflow and adjusting said at least one of the operating parameters to provide said desired engine torque when said required airflow is less than said minimum airflow.

15. The method recited in claim 14 wherein said step of determining said minimum allowable airflow further comprises the step of determining said minimum allowable airflow which would allow adjustment of said ignition timing and said air/fuel ratio to adjust the engine torque without experiencing engine misfire.

16. The method recited in claim 14 wherein said nominal settings represent an air/fuel ratio at stiochiometry.

17. The method recited in claim 16 wherein said nominal settings represent all cylinders of the engine activated.

18. The method recited in claim 17 wherein said nominal settings represent optimum ignition timing.

19. A system for controlling an actual vehicle speed of a vehicle to a desired vehicle speed, the system comprising:

an engine with operating parameters that influence an engine torque, the operating parameters comprising an air/fuel ratio of a mixture entering the engine, an ignition timing of an ignition of the mixture being burned in the engine, and a number of deactivated cylinders of the engine;

a fuel injection system coupled to said engine for delivering fuel to said engine;

a throttle valve coupled to said engine for controlling an airflow entering said engine;

a controller for calculating a desired engine torque that would cause the actual vehicle speed to approach the desired vehicle speed, determining a required airflow based on an engine speed that would generate said desired engine torque with said operating conditions at nominal settings, determining a minimum allowable airflow which would allow adjustment of at least one of the operating parameters to adjust the engine torque without adversely affecting engine performance, controlling said throttle valve to control said airflow to said required airflow when said required airflow is greater than said minimum airflow, thereby providing said desired engine torque, and controlling said throttle valve to control said airflow to said minimum airflow and adjusting said at least one of the operating parameters to provide said desired engine torque when said required airflow is less than said minimum airflow.

* * * * *